(12) United States Patent
Zhu et al.

(10) Patent No.: US 12,006,045 B2
(45) Date of Patent: Jun. 11, 2024

(54) REGENERATIVE FILTER SYSTEM

(71) Applicant: UNITED TECHNOLOGIES RESEARCH CENTRE IRELAND, LIMITED, Cork (IE)

(72) Inventors: Yonghua Zhu, Montleul (FR); Erica Zavaglio, Cork (IE)

(73) Assignee: UNITED TECHNOLOGIES RESEARCH CENTRE IRELAND, LIMITED, Cork (IE)

( * ) Notice: Subject to any disclaimer, the term of this patent is extended or adjusted under 35 U.S.C. 154(b) by 302 days.

(21) Appl. No.: 17/190,925

(22) Filed: Mar. 3, 2021

(65) Prior Publication Data

US 2021/0276720 A1 Sep. 9, 2021

(30) Foreign Application Priority Data

Mar. 5, 2020 (EP) .................................. 20161253

(51) Int. Cl.
*B64D 13/08* (2006.01)
*B64D 13/06* (2006.01)

(52) U.S. Cl.
CPC ............ *B64D 13/08* (2013.01); *B64D 13/06* (2013.01); *B64D 2013/0618* (2013.01); *B64D 2013/0651* (2013.01); *B64D 2013/0688* (2013.01)

(58) Field of Classification Search
CPC .................... B64D 13/08; B64D 13/06; B64D 2013/0618; B64D 2013/0651; B64D 2013/0688
See application file for complete search history.

(56) References Cited

U.S. PATENT DOCUMENTS

| | | | | |
|---|---|---|---|---|
| 5,323,624 | A * | 6/1994 | Schwalm | B64D 13/06 62/401 |
| 5,461,882 | A | 10/1995 | Zywiak | |
| 6,519,969 | B2 | 2/2003 | Sauterleute | |
| 10,507,927 | B2 | 12/2019 | Ludvik et al. | |
| 2001/0004837 | A1* | 6/2001 | Sauterleute | B64D 13/06 62/402 |
| 2014/0161698 | A1* | 6/2014 | Klimpel | B64D 13/08 422/123 |
| 2016/0214725 | A1 | 7/2016 | Holtrup et al. | |
| 2017/0129614 | A1* | 5/2017 | Bammann | B64D 13/06 |
| 2020/0009533 | A1* | 1/2020 | Space | B64D 13/06 |

OTHER PUBLICATIONS

Extended European Search Report for International Application No. 20161253.8 dated Sep. 10, 2020, 7 pages.

* cited by examiner

*Primary Examiner* — Edelmira Bosques
*Assistant Examiner* — Brett Peterson Mallon
(74) *Attorney, Agent, or Firm* — CANTOR COLBURN LLP

(57) ABSTRACT

A regenerative filter system includes a regenerative filter material arranged to filter air recirculated from an aircraft interior and means for passing a regeneration air stream through the regenerative filter material to regenerate the filter material by removing adsorbed contaminant therefrom, whereby the means for passing the regeneration air stream comprises means for expanding air exhausted from the aircraft interior and using the expanded air to drive a compressor for compressing and conditioning ram air to provide the regeneration air stream to the filter material.

9 Claims, 1 Drawing Sheet

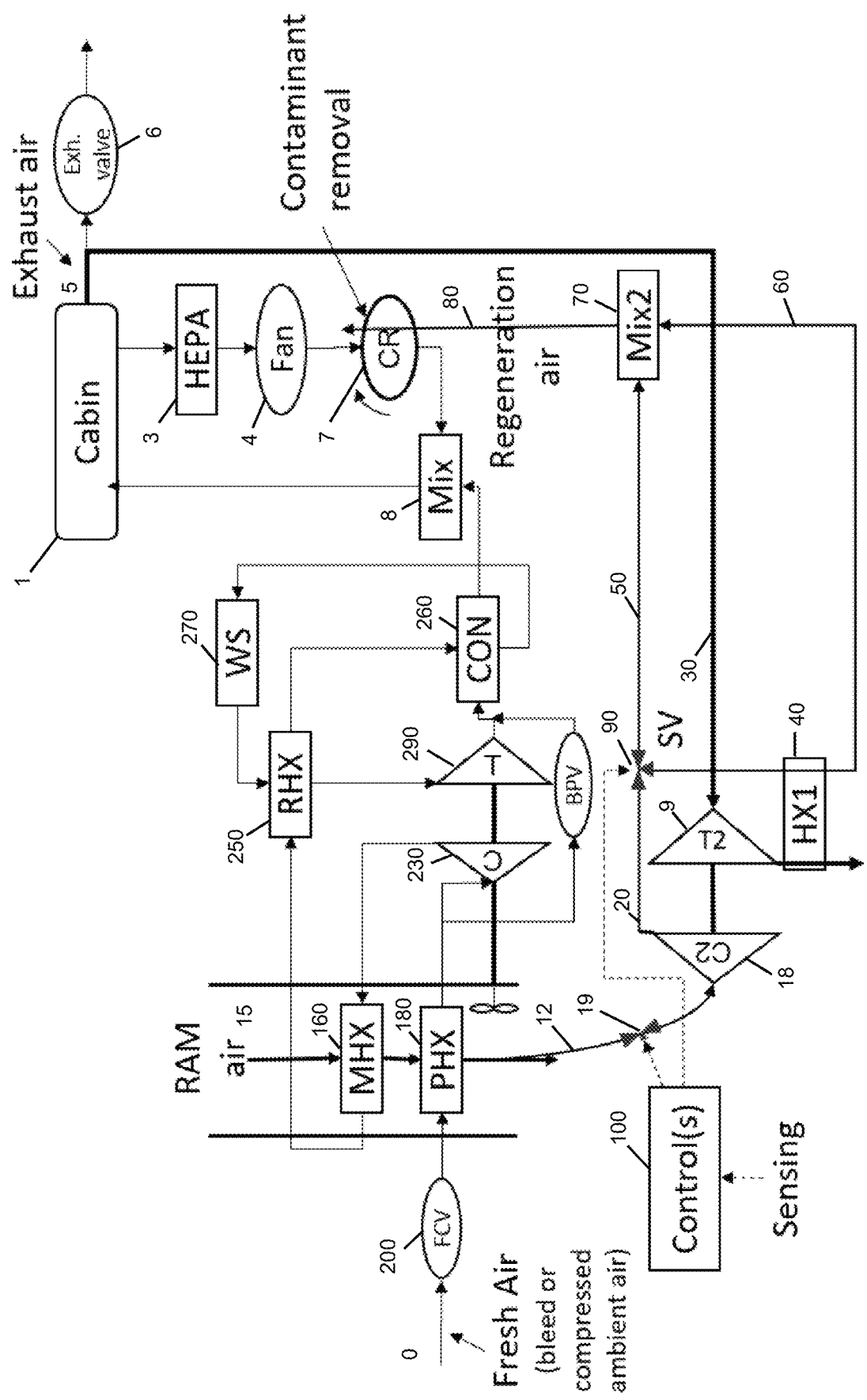

REGENERATIVE FILTER SYSTEM

FOREIGN PRIORITY

This application claims priority to European Patent Application No. 20161253.8 filed Mar. 5, 2020, the entire contents of which is incorporated herein by reference.

TECHNICAL FIELD

The present disclosure is concerned with a regenerative filter in an environmental control system for aircraft.

BACKGROUND

Environmental control systems (ECS) are provided in aircraft to provide pressurised and conditioned air to the aircraft cabin. Regulations provide for the minimum flow of conditioned air to be fed into the cabin per passenger. The Federal Aviation Authority (FAA) requires that fresh air flow rate to be at least 0.25 kg/min per passenger in order to dilute contaminants generated in the cabin, to provide thermal comfort and oxygen for occupants and to maintain cabin pressure. An ECS must be able to comply with such regulations while maximising efficiency in terms of power consumption but also minimizing overall size and weight of the ECS.

Generally, particularly in commercial aircraft, fresh air (from the aircraft engine called bleed air or compressed ambient air) is used to provide the ECS air flow. The incoming air is, however, at a relatively high temperature and pressure and needs to be conditioned to the appropriate temperature and pressure before it is fed into the cabin. The way this is usually done is to use ambient air, brought into the system via an air intake device, such as a scoop. This air—so-called ram air—is used in a system of heat exchangers to cool the bleed air or compressed ambient air. The ram air is firstly used in a main heat exchanger (MHX) as a heat sink to cool the bleed air or compressed ambient air and then in a primary heat exchanger (PHX). By the time the ram air has passed through the MHX, its temperature has already increased substantially. The ECS of an aircraft consumes the majority of the non-propulsive power. Much of this energy is consumed in extracting and conditioning the fresh air.

In order to save fuel consumption, systems have been developed that use a combination of fresh air and recirculation conditioned air from the aircraft cabin. This makes use of the energy that went into conditioning the air when it was supplied to the cabin from the exhausted air. A mix of fresh air and already conditioned, exhausted air therefore reduces fuel consumption as less fresh air needs to be conditioned in generating new conditioned air to be supplied to the cabin. A 50:50 mix of fresh air and recirculated air is generally used. There is a desire to further reduce the proportion of fresh air and use more recirculation air, to further reduce fuel consumption.

There is great pressure on the aircraft industry to improve energy efficiency and to reduce emissions and there is, therefore, a need for a more energy efficient ECS. It is therefore desirable to reduce the amount of fresh air required by the ECS, and make more use of recirculation air taking into account the need to control contamination and humidity.

If more recirculation air is used in the air being supplied to the cabin in an ECS, it is important that contaminants, e.g. $CO_2$/volatile organic compounds (VOCs), are removed from the recirculated air. It might be also necessary to control humidity levels in the aircraft cabin.

Systems have therefore been developed to filter recirculation air for use in an ECS. Whilst many types of filter can be used, it is particularly advantageous if the filter can be regenerated in situ, i.e. so that the filter material can be cleaned of adsorbed contaminants/moisture and thus refreshed or regenerated for continued or further use. Such regenerative filters mean that the ECS can run with less downtime and it is not necessary to remove and replace the filters. This is particularly advantageous in aircraft. Various types of regenerative filters are known that can be incorporated in an ECS.

As mentioned above, there is a general desire to reduce the power consumption in aircraft, and in aircraft ECSs which use a high proportion of the non-propulsive energy consumed. Adding the feature of a regenerative filter aids in this respect as it allows the use of recirculation air in the ECS, thus reducing the amount of fresh air that has to be conditioned. On the other hand, though, energy is required by the regenerative filters themselves to perform the regenerative function, which offsets some of the energy savings they provide.

SUMMARY

Embodiments are directed to a system of the present disclosure aims to provide energy to a regenerative filter in a more efficient manner.

The system of this disclosure recovers energy from air exhausted from the aircraft interior and uses it to create an air stream with suitable temperature and pressure for regeneration of the regenerative filter.

In one aspect, there is provided a regenerative filter system comprising a regenerative filter material arranged to filter air recirculated from an aircraft interior and means for passing a regeneration air stream through the regenerative filter material to regenerate the filter material by removing adsorbed contaminant therefrom, whereby the means for passing the regeneration air stream comprises means for expanding air exhausted from the aircraft interior and using the expanded air to drive a compressor for compressing and conditioning ram air to provide the regeneration air stream to the filter material.

The regenerative filter material is preferably provided in a contaminant removal device such as a rotating filter or a pressure or temperature swing filter, or any available air driven regenerative filter known in the art.

The means for expanding the air exhausted from the aircraft interior preferably comprises a turbine which drives the compressor to compress ram air that is passed through the filter material to regenerate the filter material.

In a preferred embodiment, the compressed ram air is mixed with cooled compressed ram air before being passed through the filter material. The cooled ram air is preferably cooled by a heat exchanger.

According to another aspect, there is provided an aircraft environmental control system, comprising means for mixing and conditioning fresh air and recirculation air from an aircraft interior to provide mixed, conditioned air to the aircraft interior, the system further comprising one or more regenerative filters arranged in a path of at least part of the recirculating air, prior to the means for mixing and conditioning, the one or more regenerative filters configured to remove one or more contaminants and/or moisture from the recirculation air before mixing and conditioning, and means for passing a regeneration air stream through the regenerative filter(s) to regenerate the filter(s) by removing adsorbed contaminant therefrom, whereby the means for passing the regeneration air stream comprises means for expanding air exhausted from the aircraft interior and using the expanded air to drive a compressor for compressing and conditioning ram air to provide the regeneration air stream to the filter(s).

Also provided is a method of providing regeneration air to a regenerative filter of an aircraft environmental control system, the method comprising expanding air exhausted from an interior of the aircraft and using the expanded air to drive a compressor for compressing and conditioning ram air to provide the regeneration air stream to the filter material.

Preferably, the air is expanded by a turbine which drives the compressor.

BRIEF DESCRIPTION OF THE DRAWING

FIG. 1 is a schematic view of an environmental control system having a regenerative filter system according to the disclosure.

DETAILED DESCRIPTION

FIG. 1 shows an embodiment of an ECS according to the disclosure. It is envisaged that other configurations could fall within the scope of the invention as defined by the claims.

ECS are known that combine recirculation air and conditioned bleed air to supply conditioned air to an aircraft cabin. The components of such a system are shown in FIG. 1, but these will not be described in detail.

FIG. 1 shows an aircraft ECS. Conditioned air is provided to interior regions of the aircraft e.g. the passenger cabin, the cockpit and/or cargo areas etc. from the environmental control system (ECS). Fresh air and some recirculation air (i.e. conditioned air recirculated from the aircraft) are mixed in a mixer 8 and conditioned using a known arrangement of valves, heat exchangers, turbines and compressor and to provide suitably conditioned air to the aircraft interior.

This part of the ECS will not be described in detail here but, briefly, the ECS provides conditioned air to the aircraft cabin 1. The source air is fresh air 0 either bleed air from the aircraft engine or compressed ambient air. This is provided to the ECS via a flow control valve 200 which changes position depending on flight conditions of the aircraft. As the fresh air temperature and pressure are too high for the conditioned air, cool ram air 15 is provided into the ECS. The ram air is used as the cooling or working fluid in a heat exchange system to which the fresh air is provided as the fluid to be cooled. The heat exchange system can be any available heat exchanger known in the art. In the examples shown, the heat exchange system comprises a main heat exchanger MHX 160 followed by a primary heat exchanger PHX 180. The ram air acts as a heat sink, in the heat exchange system, thus cooling the fresh air.

The fresh air goes from primary heat exchanger PHX 180, to the compressor 230 and then flows to the main heat exchanger MHX 160. Some of the air from the primary heat exchanger may pass through a bypass valve BPV, to the outlet of a turbine 290.

After the compression phase, the main stream passes through the main heat exchanger MXH 160 and then passes through the hot side of a reheater, RHX, 250 and condenser, CON, 260 where condensates form. After entering the water separator, WS, 270 the collected condensate is sprayed into the ram channel to enhance heat transfer effect. The export dry air undergoes temperature and pressure reductions in the turbine, T, 290 after passing through the cold side of RHX 250. The fresh air main stream, is then mixed with the fresh air coming from the bypass valve BPV before passing to the cold side of the condenser CON 260 and being mixed to the recirculated air in the mixing chamber MIX 8. The mixed air is then provided to the cabin 1 to set the cabin air to the desired temperature and pressure. The cabin air needs to be maintained at the required temperature and pressure, and as the air becomes warm it is fed out of the cabin as exhaust air 5 and is replaced by new conditioned air. As mentioned above, this exhaust air is then usually just emitted to the outside environment as waste.

The recirculated air 2 is generally filtered (at HEPA 3) and conveyed to the mixer via a fan 4. Conditioned air from the aircraft that is not recirculated is exhausted 5 overboard from the aircraft, e.g. via an overboard valve 6. As mentioned above, in conventional systems, recirculated air and fresh air will be mixed in equal proportions.

According to this disclosure, to allow more recirculated air to be used in the ECS mix (and, therefore, less fresh air) the recirculation air 2 exiting the aircraft, or a portion of it, is passed through one or more filters 7, arranged to remove contaminants and/or humidity from the air before it is mixed in the ECS. The filter(s) 7 will remove contaminants and/or moisture from the air and the purified air is then provided to the mixer (as before). Whilst all of the air may be passed through the filter(s), as shown, some of the air may bypass the filter(s) and go straight to the mixer in case the filter(s) fail. In some conditions, e.g. where there are fewer passengers in the cabin, the filters can be bypassed completely.

Different types of filter are known, such as rotating filters or pressure or temperature swing adsorption filters and these will not be described further. Such filters are preferably regenerative, i.e. the adsorbing filter material can regenerate to extend the use of the filter.

In addition to the contaminant removal feature provided by the filter, the system of the present disclosure also incorporates regenerative features as described further below. The regenerative contaminant filter can thus adsorb contaminants using adsorbents and the contaminants are then desorbed to ambient air through a regeneration process. The regeneration process requires a high temperature flow of regeneration air for regeneration that is then dumped overboard. Different types of regeneration process are known, but these require additional power from the engine for the regeneration process.

The system of this disclosure provides a regeneration process and system having minimised impact on the energy required from the engine and thus on fuel consumption.

In the regenerative operation of this disclosure, use is made of air 5 exhausted from the aircraft. This exhaust air is usually dumped out of the aircraft cabin to maintain pressure during flight and will usually be discharged into ambient air thus wasting the energy in that air. In the system of this disclosure, this exhaust air is recovered and expanded by a turbine (T2) 9, which generates power from the energy in the exhausted air to drive a compressor (C2) 18. Expansion of the air at the turbine 9 causes its temperature to decrease.

An amount of ram air 12 leaving the primary heat exchanger 180 is compressed by the compressor 18. The amount of ram air compressed by the compressor 18 is determined by a controller 100 and regulated by a valve 19 according to a regeneration requirement. The pressure and temperature of this air is increased by the compressor 18. It may be that the temperature of this air is then too high for regeneration.

The compressed air 20 is therefore split into two streams. One stream 30 passes through a heat exchanger 40 (HX1) and is cooled down by the expanded exhaust air, which is used by the heat exchanger 40 as the working fluid. The other stream 50 is mixed with the resulting cooled air 60 from the heat exchanger 40 in a mixer 70 (Mix2) and the mixed stream 80 is used for the regeneration in filter 7. The proportion of air in the two streams 30, 50 is regulated through a split valve 90 (SV) and determined by a controller 100 according to regeneration requirements (e.g. temperature). The controller for valve 19 and split valve 90 may be a single control module 100 or separate control modules may be provided for each valve. The system architecture is not limited to the design shown in FIG. 1.

The compressor power input is regulated by the power output of the turbine 9, which is realised by adjusting the amount of exhaust air provided to the turbine 9, adjusted by the exhaust air valve 6.

Using such an arrangement, fuel savings can be achieved due to less fresh air being used in the ECS and using exhaust air to drive the regeneration process. There is less waste of the energy in filtered recirculation air. Further, the system can be easily extended to multiple contaminant removal systems.

The invention claimed is:

1. A regenerative filter system comprising:
a regenerative filter material arranged to filter air recirculated from an aircraft interior; and
means for passing a regeneration air stream through the regenerative filter material to regenerate the filter material by removing adsorbed contaminant therefrom, whereby the means for passing the regeneration air stream comprises a turbine for expanding exhaust air exhausted from the aircraft interior, wherein the turbine drives a compressor for compressing and conditioning ram air to provide the regeneration air stream to the regenerative filter material.

2. The regenerative filter system of claim 1, wherein the regenerative filter material is provided in a contaminant removal device.

3. The regenerative filter system of claim 2, wherein the contaminant removal device is an air driven regenerative filter.

4. The regenerative filter system of claim 2, wherein the contaminant removal device is a pressure or temperature swing filter.

5. The regenerative filter system of claim 1, wherein the means for expanding the air exhausted from the aircraft interior comprises a turbine, which drives the compressor to compress ram air that is passed through the filter material to regenerate the regenerative filter material.

6. The regenerative filter system of claim 5, wherein the compressed ram-air is mixed with cooled compressed ram air before being passed through the regenerative filter material.

7. The regenerative filter system of claim 6, wherein the compressed ram air is cooled by a heat exchanger.

8. An aircraft environmental control system, comprising:
means for mixing and conditioning fresh air and recirculation air from an aircraft interior to provide mixed, conditioned air to the aircraft interior, the system further comprising:
one or more regenerative filters arranged in a path of at least part of the recirculating air, prior to the means for mixing and conditioning, the one or more regenerative filters configured to remove one or more contaminants and/or moisture from the recirculation air before mixing and conditioning, and
means for passing a regeneration air stream through the regenerative filter(s) to regenerate the one or more regenerative filters by removing adsorbed contaminant therefrom, whereby the means for passing the regeneration air stream comprises:
a turbine for expanding exhaust air from the aircraft interior, the turbine driving a compressor for compressing and conditioning ram air to provide the regeneration air stream to the one or more regenerative filters.

9. A method of providing a regeneration air stream to a regenerative filter of an aircraft environmental control system, the method comprising:
expanding air exhausted from an interior of the aircraft; and
using the expanded air to drive a compressor for compressing and conditioning ram air to provide the regeneration air stream to the regenerative filter.

* * * * *